United States Patent
Yoo et al.

(10) Patent No.: US 12,485,081 B2
(45) Date of Patent: Dec. 2, 2025

(54) POLYMER COATING AGENT HAVING CONCURRENTLY EXCELLENT WATER AND OIL REPELLENT PROPERTIES AND COSMETIC COMPOSITION COMPRISING SAME SHOWING EXCELLENT MAKE-UP PERSISTENCY

(71) Applicant: LG HOUSEHOLD & HEALTH CARE LTD., Seoul (KR)

(72) Inventors: Do-Hyuk Yoo, Seoul (KR); Whon-Hee Lee, Seoul (KR); Woo-Sun Shim, Seoul (KR); Jung-A Kim, Seoul (KR); Seon-A Jeong, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 733 days.

(21) Appl. No.: 17/632,669

(22) PCT Filed: Mar. 11, 2020

(86) PCT No.: PCT/KR2020/003353
§ 371 (c)(1),
(2) Date: Feb. 3, 2022

(87) PCT Pub. No.: WO2021/025254
PCT Pub. Date: Feb. 11, 2021

(65) Prior Publication Data
US 2022/0280412 A1    Sep. 8, 2022

(30) Foreign Application Priority Data

Aug. 5, 2019    (KR) .................. 10-2019-0094859

(51) Int. Cl.
*A61K 8/81* (2006.01)
*A61Q 1/06* (2006.01)
*A61Q 1/10* (2006.01)
*A61Q 1/12* (2006.01)

(52) U.S. Cl.
CPC .............. *A61K 8/8152* (2013.01); *A61Q 1/06* (2013.01); *A61Q 1/10* (2013.01); *A61Q 1/12* (2013.01); *A61K 2800/54* (2013.01)

(58) Field of Classification Search
CPC .... A61K 8/8152; A61K 2800/54; A61Q 1/06; A61Q 1/10; A61Q 1/12
See application file for complete search history.

(56) References Cited

U.S. PATENT DOCUMENTS

| | | | |
|---|---|---|---|
| 4,260,768 A | 4/1981 | Lorenz et al. | |
| 5,578,311 A | 11/1996 | Nagatani et al. | |
| 7,935,331 B2 | 5/2011 | Lin | |
| 7,998,266 B2 | 8/2011 | Morimitsu et al. | |
| 2004/0120906 A1 | 6/2004 | Toumi et al. | |
| 2006/0030686 A1 | 2/2006 | Lion | |
| 2007/0098653 A1* | 5/2007 | Tamasawa | A61K 8/02 424/59 |
| 2010/0068156 A1* | 3/2010 | Kim | A61Q 19/10 526/263 |
| 2015/0030842 A1 | 1/2015 | Hama et al. | |
| 2019/0054000 A1* | 2/2019 | Gouse | A61K 8/025 |

FOREIGN PATENT DOCUMENTS

| | | |
|---|---|---|
| JP | 7-119168 B2 | 12/1995 |
| JP | 11-1420 A | 1/1999 |
| JP | 2000-226419 A | 8/2000 |
| JP | 2001-316427 A | 11/2001 |
| JP | 2006-37109 A | 2/2006 |
| JP | 2007-210939 A | 8/2007 |
| JP | 2017-149649 A | 8/2017 |
| JP | 2018-115150 A | 7/2018 |
| KR | 10-2004-0056256 A | 6/2004 |
| KR | 10-0587242 B1 | 6/2006 |
| KR | 10-1773680 B1 | 8/2017 |
| WO | WO 2014/050177 A | 4/2014 |
| WO | WO-2017217983 A1 * | 12/2017 ............. A45D 40/00 |
| WO | 2018/017570 A1 | 1/2018 |

OTHER PUBLICATIONS

Poly(2-ethylhexyl methacrylate; https://scipoly.com/shop/poly2-ethylhexyl-methacrylate-2/; site accessed Aug. 2024 (Year: 2021).*
Isopropyl methacrylate Tg; https://www.sigmaaldrich.com/US/en/technical-documents/technical-article/materials-science-and-engineering/polymer-synthesis/thermal-transitions-of-homopolymers?srsltid=AfmBOoo59GPWiz9yuzLGaivp17axWnExxk05LDYfP29aS4ObPvsZLyXA; site accessed Aug. 2024 (Year: 2024).*
Google Search; is tris trimethylsiloxy silyl propyl methacrylate also known as TRIS; accessed Feb. 2025 (Year: 2025).*
International Search Report for PCT/KR2020/003353 mailed on Jun. 19, 2020.

* cited by examiner

*Primary Examiner* — Robert A Wax
*Assistant Examiner* — John W Lippert, III
(74) *Attorney, Agent, or Firm* — Birch, Stewart, Kolasch & Birch, LLP

(57) ABSTRACT

The present disclosure relates to a film-forming polymer with both of excellent water-repellent and oil-repellent properties and a cosmetic composition with excellent long-lasting property comprising the same. The film-forming polymer and cosmetic composition comprising the same according to the present disclosure increase the durability of makeup, so that even after a long period of time, numbers of correction makeup are reduced or does not need to be corrected.

12 Claims, 1 Drawing Sheet

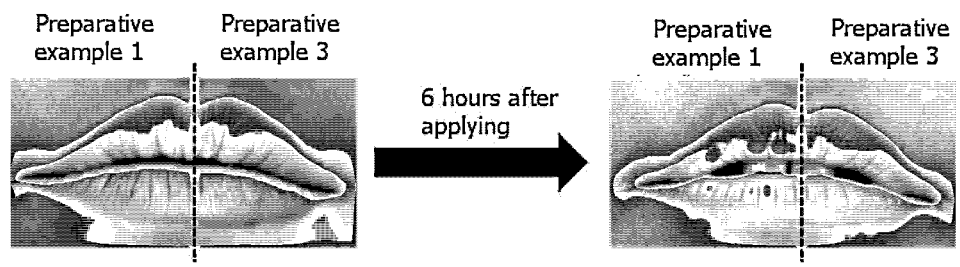

POLYMER COATING AGENT HAVING CONCURRENTLY EXCELLENT WATER AND OIL REPELLENT PROPERTIES AND COSMETIC COMPOSITION COMPRISING SAME SHOWING EXCELLENT MAKE-UP PERSISTENCY

TECHNICAL FIELD

The present application claims the priority based on Korean Patent Application No. 10-2019-0094859 filed on Aug. 5, 2019, and the entire contents disclosed in the description and drawings of the corresponding application are incorporated in the present application.

The present disclosure relates to a film-forming polymer and a cosmetic composition with excellent long-lasting property comprising the same.

BACKGROUND ART

In general, color cosmetics comprise three main components of powder, oil and water. Based on purpose of use, formulation type or composition ratio, the color cosmetics may be categorized into base makeup such as face powder, compact, powder foundation, two-way cake, makeup base, liquid foundation and cream foundation, and the like, and point makeup such as eye shadow, powder blush, lipstick, eyeliner and mascara, and the like.

These products are applied to skin and adhered for about 8 hours to 12 hours, and during attachment the makeup may crumble by sweat or sebum, external moisture, or the like secreted from the skin, so they may be transferred on cell phones, cups, clothing and the like. Consumers are implementing correction makeup in way of reapplying with or without remove because makeup is erased at the time of drinking and eating. Thus, there is the demand for cosmetics or makeup methods with long-lasting property, resulting in eliminating or reducing the need of correction makeup.

In order to solve the makeup durability, in Japanese Patent Publication No. 7-119168, the method for reducing greasiness caused by excessive sweat and sebum by using the powder coated with silicone or fluorine-based surface treatment agent to prevent the powder from getting wet with sweat or sebum is proposed. However, the powder coated with silicone-based surface treatment agent cannot maintain makeup durability due to wetting by sebum. In addition, the powder coated with fluorine-based surface treatment agent has weak adhesion between powder-powder or powder-skin, thereby the makeup layer itself floats over the secreted sebum, and the feeling of use and formulation stability are deteriorated.

In addition, the methods mixing powder having excellent oil absorption properties for absorbing excess sebum have been proposed, but this powder may also absorb water or oil as added during cosmetic production, and therefore, upon makeup, it has significantly lost oil absorption property. In case of blending a large amount of the oil-absorbable powder in powder products, oil blended as a binder may be excessively absorbed, it makes molding difficult, and thus it could not increase the blending amount.

As another method, there is a method for increasing makeup durability by using metal oxide. The metal ion in the metal oxide may react with fatty acid as a component of sebum and main greasiness-inducing material, resulting in solidification into form of its metal salt.

However, the above methods cannot be the fundamental solutions for increasing the makeup durability without causing changes in the makeup layer.

Numerous documents are referenced throughout the present description and citations thereof are indicated. The disclosures of the cited documents are incorporated herein by reference in their entirety to more clearly set forth the level of the art to which the present disclosure pertains and the content of the present disclosure.

DISCLOSURE

Technical Problem

Accordingly, in order to solve the above problem, an object of the present disclosure is to provide a film-forming polymer having both of water-repellent and oil-repellent properties.

Another object of the present disclosure is to provide a cosmetic composition and a cosmetic with excellent long-lasting property without being transferred or erased by sweat or sebum, external moisture, or the like.

Other object and advantages of the present disclosure will become more apparent from the following detailed description, claims and drawings.

Technical Solution

One aspect of the present disclosure is to provide a film-forming polymer comprising both of a hydrophilic structure and an aromatic structure, which can improve long-lasting property of a cosmetic formulation.

A water-dispersible film-forming polymer has the oil-repellent property, but cannot be used in various fields because of the limited the water-repellent property. An oil-dispersible film-forming polymer may be hydrocarbon-based, silicon-based or silicone-acrylic-based copolymers, but has insufficient oil-repellent property, so the makeup durability may not be expressed sufficiently. In addition, although it is attempted to improve the properties by combining various silicone-based film-forming polymers, it has the complicated manufacturing process and it is insufficient to simultaneously realize water-repellent/oil-repellent properties.

An object of the present disclosure is to prepare the film-forming polymer capable of improving makeup durability by introducing a hydrophilic structure and an aromatic structure into the polymer in order to provide both water-repellent/oil-repellent properties.

The film-forming polymer according to the present invention with excellent water-repellent/oil-repellent properties comprises a hydrophilic structure and an aromatic structure in the polymer structure, and therefore, it may exhibit repellency against hydrophilic moisture and sweat and against lipophilic artificial sebum and edible oil. Specifically, the hydrophilic structure provides the oil-repellent property, and the aromatic structure provides water-repellent property and some oil-repellent property.

The hydrophilic structure may be having ionic or non-ionic electron pair structure and may comprise one or more structures selected from the group consisting of hydroxy, amine, phosphate, sulfonate, sulfate and carboxy, and for example, it includes —$NH_2$, —OH, —$SO_3H$, —$PO_4H$, —COOH, and the like, but not limited thereto. Examples of monomers having a hydrophilic structure may be acrylic-based, acrylamide-based acetamide-based, vinyl-based or aryl-based monomers, and may include 2-hydroxyethyl (meth)acrylate, vinyl acetate, vinyl pyrrolidone, aryl ether, and the like.

The aromatic structure may be structure satisfying the electron pair 4 n+2 rule, and for example, the aromatic structure comprises one or more structures selected from the group consisting of benzyl, phenyl, naphthyl, phenanthrene, anthracene and pyrene, but not limited thereto. Examples thereof may be acrylic-based, acrylamide-based, acetamide-based, vinyl-based or aryl-based monomers comprising an aromatic structure, may be selected from benzyl (meth) acrylate, phenyl (meth)acrylate, and the like.

In addition, the film-forming polymer according to the present disclosure may comprise a polymerization unit, in which the monomer comprises both a hydrophilic structure and an aromatic structure.

The monomer comprising the both structures may be one or more selected from the group consisting of 2-hydroxy-3-phenoxypropyl methacrylate (HPPMA), 2-hydroxy-3-phenoxypropyl acrylate, 2-(4-benzoil-3-hydroxyphenoxy) ethyl acrylate, 2-(4-benzoyl-3-hydroxyphenoxy)ethyl methacrylate, 2-hydroxy propyl-2-(acryloyloxy)ethyl phthalate, 2-hydroxy propyl-2-(methacryloyloxy)ethyl phthalate, 3-(2H-benzotriazol-2-yl)-4-hydroxyphenylethyl acrylate and 3-(2H-benzotriazol-2-yl)-4-hydroxyphenylethyl methacrylate, but not limited thereto.

The film-forming polymer according to the present disclosure may further comprise a hard portion capable of providing mechanical strength when the film-forming polymer is applied. To this end, the monomer of which homopolymer has a glass transition temperature of 30 to 120° C., preferably 40 to 100° C. may be comprised. Examples of such monomer may be one or more selected from t-butyl (meth)acrylate, cyclohexyl (meth)acrylate, isobornyl (meth) acrylate, isopropyl (meth)acrylate, methyl or ethyl (meth) acrylate, and the like, but not limited thereto.

In addition, in order to provide flexible property of the film-forming polymer, the monomer of which homopolymer has a glass transition temperature of −120 to 0° C., preferably −100 to −30° C. may further be comprised. Examples of such monomer may one or more be selected from silicate-based (meth)acrylate having an alkylsiloxy structure; ethylhexyl (meth)acrylate, stearyl (meth)acrylate or lauryl (meth)acrylate having an alkylacrylic-based or alkylacryl amide-based structure; and the like, but not limited thereto.

In the present disclosure, the structure comprising a hydrophilic structure or an aromatic structure or both of them in the film-forming polymer may be comprised in an amount of 5% to 40% by weight of the total structure. When it is comprised in an amount of less than 5% by weight, it may not provide makeup durability because water-repellency or oil-repellency may not appear together, and when it is 40% or more, the film-forming polymer may have the lowered stability.

The monomer providing mechanical strength may be comprised in an amount of 20 to 50% based on the total weight of the polymer, and the monomer providing flexible property may be comprised in an amount of 10 to 45% based on the total weight of the polymer.

The film-forming polymer according to the present disclosure may be prepared by polymerizing the aforementioned monomers in an oil phase. As the oil phase for synthesizing a film-forming polymer, it is preferable to use a hydrocarbon-based non-polar or silicone-based volatile oil. The hydrocarbon-based non-polar oil may comprise carbon atom number of 8 to 16, preferably, carbon atom number of 10 to 16. Example thereof may be dodecane, isododecane, isoparaffin, and the like may be used. The silicone-based volatile oil may have mainly a siloxane ($-R_2Si-O-$) structure, wherein R may be in a form of C1 to C3, and may have be one or more linear or cyclic structure. As examples thereof, cyclobutasiloxane (D4), cyclopentasiloxane (D5), cyclohexasiloxane (D6), methyl trimethicone, and the like may be used, but not limited thereto.

Other aspect of the present disclosure is to provide a cosmetic composition for improving long-lasting property of a cosmetic, comprising the film-forming polymer according to the present disclosure. In addition to the film-forming polymer according to the present disclosure as described above, the cosmetic composition according to the present disclosure may further comprise a flavoring, a colorant, a preservative, a sterilizing agent, a pearl agent, and the like, within the range that does not reduce the effect of the composition.

Other aspect of the present disclosure is to provide a cosmetic comprising the film-forming polymer according to the present disclosure. The cosmetic includes powder, face powder, pressed powder, compact, foundation, powder foundation, two-way cake, makeup base, liquid foundation, cream foundation, primer, boomer, tone-up cream, concealer, BB cream, CC cream, tinted moisturizer, eye shadow, powder blush, highlighter, shading, blusher, eye-makeup products (eyebrow, eyeliner, eye shadow and mascara, etc.), lip makeup products (rouge, lipstick, lip-gloss, lip-tint and lip-balm, etc.), and sunscreen cream, but not limited thereto.

Advantageous Effects

The film-forming polymer according to the present disclosure and cosmetic composition comprising the same have both of water-repellent and oil-repellent properties, so that makeup does not crumble and is not transferred due to sweat or sebum, external moisture, or the like. As described above, the film-forming polymer according to the present disclosure and cosmetic composition comprising the same increase the durability of makeup, so that even after a long period of time, numbers of correction makeup are reduced or does not need to be corrected.

BRIEF DESCRIPTION OF THE DRAWINGS

FIG. 1 shows images for color durability before/after meals for the Preparative example 1 and Preparative example 3.

MODE FOR INVENTION

Hereinafter, the present disclosure will be described in more detail by examples. These examples are intended to illustrate the present disclosure more specifically, and it will be obvious to those skilled in the art to which the present disclosure pertains that the scope of the present disclosure is not limited by these examples.

EXAMPLE

I. Synthesis of Oil-Dispersible Film-Forming Polymer Having Water-Repellent/Oil-Repellent Properties Comparative Example 1

In a reactor equipped with a cooler, a nitrogen injector, a thermometer and a stirrer, 200 g of isododecane as hydrocarbon-based oil, 55 g of t-butyl acrylate, 5 g of isobornyl acrylate, and 40 g of tris(trimethyl siloxy)silyl propyl methacrylate were added and mixed uniformly, and then the temperature was slowly raised to 75° C. Then, 1 g of 2,2'-azobis isobutylnitrile as an initiator was slowly added and reacted for at least 12 hours to synthesize the oil-dispersible film-forming polymer. The synthesized polymer was subjected to filtration through an urethane mesh having 200-mesh size to remove impurities. Finally, t-butyl acrylate/isobornyl acrylate/tris(trimethyl siloxy)silyl propyl methacrylate copolymer (weight ratio=55/5/40) in stable phase was obtained.

Example 1

In the same manner as in the Comparative example 1, in a reactor equipped with a cooler, a nitrogen injector, a thermometer and a stirrer, 200 g of isododecane as hydrocarbon-based oil, 55 g of t-butyl acrylate, 40 g of tris (trimethyl siloxy)silyl propyl methacrylate and 5 g of 2-hydroxy-3-phenoxypropyl acrylate were added and mixed uniformly, and then the temperature was slowly raised to 75° C. Then, 1 g of 2,2'-azobis isobutylnitrile as an initiator was slowly added to synthesize a copolymer. By reacting for at least 12 hours, finally, t-butyl acrylate/tris(trimethyl siloxy) silyl propyl methacrylate/2-hydroxy-3-phenoxypropyl acrylate copolymer (weight ratio=55/40/5) in stable phase was obtained.

Example 2

In the same manner as in the Example 1, in a reactor equipped with a cooler, a nitrogen injector, a thermometer and a stirrer, 200 g of isododecane as hydrocarbon-based oil, 45 g of t-butyl acrylate, 30 g of tris(trimethyl siloxy)silyl propyl methacrylate and 10 g of 2-hydroxy-3-phenoxypropyl acrylate were added and mixed uniformly, and then the temperature was slowly raised to 75° C. Then, 0.85 g of 2,2'-azobis isobutylnitrile as an initiator was slowly added to synthesize a copolymer, and after the reaction for 6 hours, 15 g of 2-hydroxy-3-phenoxypropyl acrylate and 0.15 g of 2,2'-azobis isobutylnitrile as an initiator were further added, and further reacted for at least 12 hours, and thereby, finally, t-butyl acrylate/tris(trimethyl siloxy)silyl propyl methacrylate/2-hydroxy-3-phenoxypropyl acrylate copolymer (weight ratio=45/30/25) in stable phase was obtained.

Example 3

Under the same synthesis conditions as the Example 2, 200 g of isododecane, 30 g of t-butyl acrylate, 30 g of tris(trimethyl siloxy)silyl propyl methacrylate and 20 g of 2-hydroxy-3-phenoxypropyl acrylate were added and mixed uniformly, and then the temperature was slowly raised to 75° C. Then, 0.8 g of 2,2'-azobis isobutylnitrile as an initiator was slowly added to synthesize a copolymer, and after the reaction for 6 hours, 20 g of 2-hydroxy-3-phenoxypropyl acrylate and 0.2 g of 2,2'-azobis isobutylnitrile as an initiator were further added, and reacted for at least 12 hours, and thereby, finally, t-butyl acrylate/trimethylsiloxysilyl propyl methacrylate/2-hydroxy-3-phenoxypropyl acrylate copolymer (weight ratio=30/32/40) in stable phase was obtained.

Example 4

Under the same synthesis conditions as the Example 2, 200 g of isododecane, 55 g of t-butyl acrylate, 40 g of tris(trimethyl siloxy)silyl propyl methacrylate, 2.5 g of 2-hydroxyethyl acrylate and 2.5 g of phenyl acrylate were added and mixed uniformly, and then the temperature was slowly raised to 75° C. Then, 1 g of 2,2'-azobis isobutylnitrile as an initiator was slowly added to synthesize a copolymer. By reacting for at least 12 hours, finally, t-butyl acrylate/tris (trimethyl siloxy)silyl propyl methacrylate/2-hydroxyethyl acrylate/phenyl acrylate copolymer (weight ratio=55/40/2.5/2.5) in stable phase was obtained.

Example 5

Under the same synthesis conditions as the Example 2, 200 g of isododecane, 45 g of t-butyl acrylate, 30 g of tris(trimethyl siloxy)silyl propyl methacrylate, 5 g of 2-hydroxyethyl acrylate and 5 g of phenyl acrylate were added and mixed uniformly, and then the temperature was slowly raised to 75° C. Then, 0.85 g of 2,2'-azobis isobutylnitrile as an initiator was slowly added to synthesize a copolymer, and after the reaction for 6 hours, 7.5 g of 2-hydroxyethyl acrylate, 7.5 g of phenyl acrylate and 0.15 g of 2,2'-azobis isobutylnitrile as an initiator were further added, and reacted for at least 12 hours, and thereby, finally, t-butyl acrylate/tris(trimethyl siloxy)silyl propyl methacrylate/2-hydroxyethyl acrylate/phenyl acrylate copolymer (weight ratio=45/30/12.5/12.5) in stable phase was obtained.

TABLE 1

| | | Comparative example 1 | Example 1 | Example 2 | Example 3 | Example 4 | Example 5 |
|---|---|---|---|---|---|---|---|
| Monomer | t-butyl acrylate | 55 | 55 | 45 | 30 | 55 | 45 |
| | Isobornyl acrylate | 5 | — | — | — | — | — |
| | Tris(trimethyisiloxy)silyl propyl methacrylate | 40 | 40 | 30 | 30 | 40 | 30 |
| | 2-hydroxy-3-phenoxypropyl acrylate | — | 5 | 25 | 40 | — | — |
| | 2-hydroxyethyl acrylate | — | — | — | — | 2.5 | 12.5 |
| | Phenyl acrylate | — | — | — | — | 2.5 | 12.5 |
| Initiator | 2,2'-azobisisobutyl nitrile | 1 | 1 | 1 | 1 | 1 | 1 |
| Solvent | Isododecane | 200 | 200 | 200 | 200 | 200 | 200 |
| Stability | | Stable | Stable | Stable | Precipitated | Stable | Precipitated |

II. Analysis on Water-Repellent/Oil-Repellent Properties and Stickiness of Film-Forming Polymer Using the above 6 kinds of water-repellent/oil-repellent oil-dispersible film-forming polymers having the composition shown in Table 1, the films were prepared, and physical properties thereof were evaluated.

1. Preparation Method
   1) 4 kinds of film-forming polymers were aliquoted in 2 mL each and dropped on a slide glass.
   2) Using Doctor blade coater, it was coated in a thickness of 50 μm.

3) In a 70° C. convection oven, it was dried for 12 hours or more.
4) The dried samples were placed at a room temperature for 6 hours or more.

2. Evaluation Method
   1) Using a contact angle measuring device, contact angles for water and artificial sebum were measured.
   2) Distilled water for water, and a mixed solution of CAPRYLIC/CAPRIC TRIGLYCERIDE and JOJOBA OIL, ISOSTEARIC ACID for artificial sebum were used.
   3) Stickiness was evaluated by measuring ball tackiness with a texture analyzer.
   4) The stickiness was evaluated by measuring the tension required for peeling off after contacting for 5 seconds with a contact force of 100 g.

The initial contact angle/stickiness for water or the artificial sebum and the edible oil as measured by the above methods were shown in Table 2 below.

TABLE 2

|  | Comparative example 1 | Example 1 | Example 2 | Example 3 | Example 4 | Example 5 |
|---|---|---|---|---|---|---|
| Water contact angle | 72° | 89° | 95° | 96° | 85° | 93° |
| Artificial sebum contact angle | 22° | 35° | 49° | 51° | 28° | 34° |
| Edible oil contact angle | 27° | 38° | 52° | 50° | 30° | 39° |
| Stickiness | 22.4 gf | 10.6 gf | 5.2 gf | 6.8 gf | 15.7 gf | 18.8 gf |

As results of the experiment, the Examples 1-3 as prepared by using the monomer comprising both of hydrophilic portion and hydrophobic portion showed little stickiness, but when the hydrophobic portion and hydrophilic portion were present in different monomers, it was disadvantageous in terms of stickiness.

Iii. Preparation of Oil-Dispersed Lip-Rouge

Using the Preparative examples and the Comparative examples, oil-dispersed lip-rouge formulations were prepared as the composition shown in Table 3, and qualities thereof were evaluated.

1. Preparation Method
   1) Components 1~3 were dispersed while heating at 50° C.
   2) Component 7 was added to 1) and dispersed uniformly, and then components 4-6 were dispersed while heating at 50° C.
   3) After cooling to a room temperature, the oil-dispersed lip-rouges were prepared.

TABLE 3

| (% by weight) | Preparative example 1 | Preparative example 2 | Preparative example 3 | Preparative example 4 |
|---|---|---|---|---|
| 1 Comparative example 1 | 60 | — | — | — |
| Example 1 | — | 60 | — | — |
| Example 2 | — | — | 60 | — |
| Example 3 | — | — | — | 60 |
| 2 Isododecane | 25 | 25 | 25 | 25 |
| 3 1,2-Hexanediol | 0.5 | 0.5 | 0.5 | 0.5 |
| 4 Dimethicone | 0.5 | 0.5 | 0.5 | 0.5 |
| 5 Inorganic powder (hectorite-based) | 3 | 3 | 3 | 3 |
| 6 Propylene carbonate | 1 | 1 | 1 | 1 |
| 7 RED-based base pigment | 10 | 10 | 10 | 10 |
| User's evaluation for Oil-dispersed lip-rouge | | | | |
| 1) Spreadability | ○ | ○ | ○ | △ |
| 2) Makeup effect | ○ | ○ | ○ | ○ |
| 3) Transfer resistant | X | ○ | ◎ | △ |
| 4) Smear | X | ○ | ◎ | ○ |
| 5) Color durability | X | △ | ◎ | △ |

2. Evaluation on Oil-Dispersed Lip-Rouge Formulation

For the prepared oil-dispersed lip-rouge formulations, user's evaluation was carried out by 15 professional evaluation panels (20~35 years old).

With respect to the oil-dispersed lip-rouge formulations, spreadability (property that applied smoothly when applied on lips), makeup effect, transfer resistance against drinking and eating after 6 hours of application, and the remained amount of makeup on lips were tested, and thereby the color durability was evaluated in 5 level based on the following criteria and the average was calculated.

The result of Table 3 is described as follows: ◎ means average point of 4 or more, ○ means average point of 3 or more to less than 4, △ means average point of 2 or more and less than 3, and X means average point of less than 2.

In case of the Preparative examples 2~4 comprising a water-repellent/oil-repellent film-forming polymer, compared to Preparative example 1 not comprising this, overall, the makeup durability was excellent. In addition, the Preparative example 3 comprising the water-repellent/oil-repellent film-forming polymer having uniform and stable phase was particularly excellent in makeup durability.

IV. Preparation of W/O Liquid Foundation

Using the Preparative examples and the Comparative examples, W/O liquid foundation formulations were prepared as the composition shown in Table 4, and qualities thereof were evaluated.

1. Preparation Method
   1) Components 1 and 4 were dispersed uniformly and then components 6, 2 and 3 were added in order while heating at 50 degrees.
   2) Component 8 was added to 1) and dispersed uniformly, and then Components 5 and 7 were dispersed while heating at 50 degrees.
   3) After cooling to a room temperature, W/O liquid foundations were prepared.

TABLE 4

| (% by weight) | Preparative example 1 | Preparative example 2 | Preparative example 3 | Preparative example 4 |
|---|---|---|---|---|
| 1 Comparative example 1 | 15 | — | — | — |
| Example 1 | — | 15 | — | — |
| Example 2 | — | — | 15 | — |
| Example 3 | — | — | — | 15 |

TABLE 4-continued

| (% by weight) | Preparative example 1 | Preparative example 2 | Preparative example 3 | Preparative example 4 |
|---|---|---|---|---|
| 2 Alcohol | 5 | 5 | 5 | 5 |
| 3 Distilled water | 30 | 30 | 30 | 30 |
| 4 Volatile oil (ex. cyclopentasiloxane) | 20 | 20 | 20 | 20 |
| 5 Inorganic powder (hectorite-based) | 5 | 5 | 5 | 5 |
| 6 W/O emulsifier | 2 | 2 | 2 | 2 |
| 7 Emollient | 3 | 3 | 3 | 3 |
| 8 Pigment | 20 | 20 | 20 | 20 |
| User's evaluation for W/O foundation | | | | |
| 1) Makeup effect | Δ | ○ | ○ | Δ |
| 2) Transfer resistant | X | ○ | ◎ | Δ |

2. Evaluation on W/O Liquid Foundation

For the prepared W/O liquid foundation formulations, user's evaluation was carried out by 15 professional evaluation panels (20~35 years old).

With respect to the prepared foundations, makeup effect (speadability, stickiness, etc.) and transferred amount to clothing, cell phones, and the like after 6 hours of application were tested, and thereby the makeup durability was evaluated in 5 level based on the following criteria and the average was calculated.

The result of Table 4 is described as follows: ◎ means average point of 4 or more, ○ means average point of 3 or more to less than 4, Δ means average point of 2 or more and less than 3, and X means average point of less than 2.

In case of the Preparative examples 2~4 comprising the water-repellent/oil-repellent film-forming polymer, compared to the Preparative example 1 not comprising this, overall, the makeup durability was excellent. In addition, the Preparative example 3 comprising a water-repellent/oil-repellent film-forming polymer having uniform and stable phase was particularly excellent in makeup durability.

V. Preparation of O/W Sunscreen Cream

Using the Preparative examples and the Comparative examples, O/W sunscreen creams were prepared as the composition shown in Table 5, and qualities thereof were evaluated.

1. Preparation Method
   1) Components 1 and 4 were dispersed uniformly and then components 6, 2 and 3 were added in order while heating at 50 degrees.
   2) Component 8 was added to 1) and dispersed uniformly, and then Components 5 and 7 were dispersed while heating at 50 degrees.
   3) After cooling to a room temperature, W/O sunscreen creams were prepared.

TABLE 5

| (% by weight) | Preparative example 1 | Preparative example 2 | Preparative example 3 | Preparative example 4 |
|---|---|---|---|---|
| 1 Comparative example 1 | 2 | — | — | — |
| Example 1 | — | 2 | — | — |
| Example 2 | — | — | 2 | — |
| Example 3 | — | — | — | 2 |
| 2 Alcohol | 18 | 18 | 18 | 18 |
| 3 Distilled water | 51 | 51 | 51 | 51 |
| 4 Volatile oil (ex. cyclopentasiloxane) | 20 | 20 | 20 | 20 |
| 5 UV blocking agent | 5 | 5 | 5 | 5 |
| 6 O/W emulsifier | 2 | 2 | 2 | 2 |
| 7 Plastic powder | 2 | 2 | 2 | 2 |
| User's evaluation for O/W sunscreen cream | | | | |
| 1) UV blocking effect maintenance level | X | X | ○ | Δ |

2. Evaluation Method on O/W Sunscreen Cream

After applying the prepared O/W sunscreen cream formulation to a slide glass, by comparing the initial UV blocking effect with the UV blocking effect after washing once with tap water, the evaluation for the UV blocking effect maintenance was carried out.

The result of Table 5 is explained as follows: ○, the maintained UV blocking effect by 40% or more; Δ, the maintained UV blocking effect by 20% or more to less than 40%; and X, the maintained UV blocking by less than 20%.

In case of the Preparative examples 2~4 comprising a water-repellent/oil-repellent film-forming polymer, compared to the Preparative example 1 not comprising this, overall, the UV blocking effect maintenance was excellent. In addition, the Preparative example 3 comprising a water-repellent/oil-repellent film-forming polymer having uniform and stable phase was particularly excellent in the UV blocking effect maintenance.

The invention claimed is:

1. A method of preparing a cosmetic formulation, said method comprising:
   providing a film-forming polymer, and
   combining the film-forming polymer with at least one excipient to form the cosmetic formulation,
   wherein the film-forming polymer comprises a polymerization unit comprising the following monomers:
   (i) 5 to 40% by weight of 2-hydroxy-3-phenoxypropyl acrylate,
   (ii) 30 to 55% by weight of t-butyl acrylate, and
   (iii) 30 to 45% by weight of tris(trimethylsiloxy)silyl propyl methacrylate;
   wherein the cosmetic formulation is a face powder, a pressed powder, a compact, a foundation, a powder foundation, a two-way cake, a makeup base, a liquid foundation, a cream foundation, a primer, a boomer, a tone-up cream, a concealer, a BB cream, a tinted moisturizer, an eye shadow, a powder blush, a highlighter, a shading, a blusher, an eye-makeup product, a lip makeup product, or a sunscreen cream, and
   wherein the cosmetic formulation comprises isododecane or cyclopentasiloxane.

2. The method according to claim 1, wherein the film-forming polymer has both water-repellent and oil-repellent properties.

3. The method according to claim 1,
   wherein the film-forming polymer further comprise a polymerization unit having a monomer providing mechanical strength, and wherein a homopolymer of the monomer providing the mechanical strength has a glass transition temperature of 30° C. to 120° C.

4. The method according to claim 1,
wherein the film-forming polymer further comprise a polymerization unit having a monomer providing flexibility, and
wherein a homopolymer of the monomer providing the flexibility has a glass transition temperature of −120° C. to 0° C.

5. A cosmetic formulation prepared according to the method of claim 1.

6. The method according to claim 1, wherein the at least one excipient comprises an inorganic powder, an oil, water, or mixtures thereof.

7. The method according to claim 6, wherein the at least one excipient further comprises a flavoring, a colorant, a preservative, a sterilizing agent, a pearl agent, or mixtures thereof.

8. The method according to claim 1, wherein the cosmetic formulation is an eye-makeup product selected from the group consisting of an eyebrow product, an eyeliner, an eye shadow and a mascara product.

9. The method according to claim 1, wherein the cosmetic formulation is a lip makeup product selected from the group consisting of a rouge, a lipstick, a lip-gloss, a lip-tint and a lip-balm.

10. The method according to claim 1, wherein the film-forming polymer comprises a polymerization unit comprising the following monomers:
(i) 5% by weight of 2-hydroxy-3-phenoxypropyl acrylate,
(ii) 55% by weight of t-butyl acrylate, and
(iii) 40% by weight of tris(trimethyl siloxy)silyl propyl methacrylate.

11. The method according to claim 1, wherein the film-forming polymer comprises a polymerization unit comprising the following monomers:
(i) 25% by weight of 2-hydroxy-3-phenoxypropyl acrylate,
(ii) 45% by weight of t-butyl acrylate, and
(iii) 30% by weight of tris(trimethyl siloxy)silyl propyl methacrylate.

12. The method according to claim 1, wherein the film-forming polymer comprises a polymerization unit comprising the following monomers:
(i) 40% by weight of 2-hydroxy-3-phenoxypropyl acrylate,
(ii) 30% by weight of t-butyl acrylate, and
(iii) 30% by weight of tris(trimethyl siloxy)silyl propyl methacrylate.

* * * * *